US012767301B2

(12) United States Patent
Iwata

(10) Patent No.: US 12,767,301 B2
(45) Date of Patent: Oct. 20, 2026

(54) OUTBOARD MOTOR

(71) Applicant: SUZUKI MOTOR CORPORATION, Hamamatsu (JP)

(72) Inventor: Seiichiro Iwata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 212 days.

(21) Appl. No.: 18/814,916

(22) Filed: Aug. 26, 2024

(65) Prior Publication Data

US 2025/0083787 A1 Mar. 13, 2025

(30) Foreign Application Priority Data

Sep. 13, 2023 (JP) ................................ 2023-148166

(51) Int. Cl.

| | |
|---|---|
| ***B63H 20/00*** | (2006.01) |
| ***B01D 29/01*** | (2006.01) |
| ***B63B 35/32*** | (2006.01) |
| ***C02F 1/00*** | (2023.01) |
| *C02F 103/00* | (2006.01) |
| *C02F 103/08* | (2006.01) |

(52) U.S. Cl.

CPC ............ *B63H 20/00* (2013.01); *B01D 29/01* (2013.01); *B63B 35/32* (2013.01); *C02F 1/001* (2013.01); *C02F 2103/007* (2013.01); *C02F 2103/08* (2013.01)

(58) Field of Classification Search

CPC .................................................... B63H 20/001

See application file for complete search history.

(56) References Cited

U.S. PATENT DOCUMENTS

| | | | | |
|---|---|---|---|---|
| 3,852,378 A * | 12/1974 | Guida | ................... | E02B 15/046 261/120 |
| 5,769,674 A * | 6/1998 | Stallman | ................ | B63H 11/08 440/46 |
| 6,244,918 B1 * | 6/2001 | Cameron | ............ | B63H 20/245 440/89 R |
| 11,591,058 B2 * | 2/2023 | Kimpara | ............... | F02B 61/045 |
| 12,359,385 B2 * | 7/2025 | Kimpara | ................ | B63H 20/00 |
| 12,545,609 B2 * | 2/2026 | O'Loughlin | .............. | C02F 7/00 |
| 2021/0316833 A1 | 10/2021 | Kimpara | ................ | B63H 20/28 |
| 2024/0009602 A1 * | 1/2024 | Araki | ...................... | B63B 35/32 |
| 2025/0083776 A1 * | 3/2025 | Iwata | ...................... | B63B 35/32 |
| 2025/0083777 A1 * | 3/2025 | Iwata | ................... | B63H 20/285 |

FOREIGN PATENT DOCUMENTS

| | | | | |
|---|---|---|---|---|
| CN | 110329463 A * | 10/2019 | ............. | B01D 29/01 |
| JP | 2021-169240 A | 10/2021 | | |

* cited by examiner

*Primary Examiner* — Magdalena Topolski

(74) *Attorney, Agent, or Firm* — Stein IP, LLC

(57) ABSTRACT

An outboard motor includes a fine dust capturing device, the fine dust capturing device includes a water intake for taking in water around the outboard motor, a passage through which the water taken in from the water intake flows, a filter for capturing fine dust contained in the water by allowing the water flowing through the passage to pass therethrough, and a water outlet for discharging the water after passing through the filter to a periphery of the outboard motor. The water outlet is positioned in front of the propeller and inside a circle having the same diameter as a diameter of the propeller, with a rotation center of the propeller as a center, when the outboard motor is viewed from a rear side, and faces in a direction other than a front side of the outboard motor.

8 Claims, 6 Drawing Sheets

OUTBOARD MOTOR

CROSS-REFERENCE TO RELATED APPLICATION(S)

This application is based on and claims priority under 35 USC 119 from Japanese Patent Application No. 2023-148166 filed on Sep. 13, 2023, the entire content of which is incorporated herein by reference.

TECHNICAL FIELD

The present invention relates to an outboard motor for propelling a ship.

BACKGROUND ART

In recent years, contamination due to fine dust such as microplastic has become a problem in sea, lakes, rivers and the like, and it is desired to recover such fine dust from sea, lakes, rivers and the like to purify sea, lakes, rivers and the like.

JP2021-169240A (Patent Literature 1) describes an outboard motor capable of collecting fine dust contained in water such as sea, lakes, and rivers. The outboard motor disclosed in the above publication is provided with a fine dust capturing device that captures fine dust. The fine dust capturing device has a water intake, a capturer, and a water outlet. When a ship is sailing, water in the sea, lakes, rivers, and the like flows into the capturer from the water intake, passes through a filter provided in the capturer, and is then discharged to the sea, lakes, rivers, and the like from the water outlet. When water passes through the filter, fine dust contained in the water is captured by the filter.

CITATION LIST

Patent Literature

Patent Literature 1: JP2021-169240A

In order to promote purification of sea, lakes, rivers, and the like, it is desired to increase an amount of fine dust to be captured per unit sailing time of a ship or an amount of fine dust to be captured per unit sailing distance, thereby increasing a capturing efficiency of fine dust.

In the fine dust capturing device provided in the outboard motor of the related art described in JP2021-169240A, the water intake is disposed in a front portion of the outboard motor and in a portion positioned below a water surface, and the water outlet is disposed in a portion positioned above the water surface in the outboard motor. Then, by using a pressure of the water flowing into the water intake when the ship moves forward, a flow of the water from when the water flows into the capturer via the water intake to when the water is discharged via the water outlet is generated.

In the case of such a configuration, since the flow of water from when the water flows into the capturer through the water intake to when the water is discharged through the water outlet is generated only by the pressure of the water flowing into the water intake when the ship moves forward, it is difficult to increase the flow rate of the water flowing through the capturer, and thus it is difficult to increase the flow rate of the water passing through the filter. As a result, it is difficult to increase an amount of the fine dust captured per unit sailing time or the amount of the fine dust captured per unit sailing distance, and it is difficult to increase a capturing efficiency of the fine dust.

In this regard, it is conceivable to add a pump to the fine dust capturing device and increase the flow rate of water flowing through the capturer by sucking water from the water intake by the pump. However, the addition of the pump is not preferable because it complicates the structure of the fine dust capturing device, increases the size of the outboard motor, and increases manufacturing cost of the outboard motor.

SUMMARY

The present invention has been made in view of the problems described above, and an object of the present invention is to provide an outboard motor capable of increasing a capturing efficiency of fine dust while avoiding complication of a structure of the fine dust capturing device, an increase in the size of the outboard motor, and an increase in manufacturing cost of the outboard motor.

In order to solve the problems described above, according to the present invention, there is provided an outboard motor for propelling a ship, the outboard motor including: a propeller unit including a propeller shaft, a propeller fixed to the propeller shaft, and a case for rotatably supporting the propeller shaft; a support portion formed in a columnar shape extending in an upper-lower direction and having a lower portion to which the propeller unit is supported; a bracket provided at an upper portion of the support portion and configured to attach the support portion to the ship; and a fine dust capturing device provided on the propeller unit or the support portion, in which the fine dust capturing device includes a water intake for taking in water around the outboard motor, a passage through which the water taken in from the water intake flows, a filter for capturing fine dust contained in the water by allowing the water flowing through the passage to pass therethrough, and a water outlet for discharging the water after passing through the filter to a periphery of the outboard motor, and the water outlet is positioned in front of the propeller and inside a circle having the same diameter as a diameter of the propeller, with a rotation center of the propeller as a center, when the outboard motor is viewed from a rear side, and faces in a direction other than a front side of the outboard motor.

According to the present invention, it is possible to increase the capturing efficiency of the fine dust while avoiding complication of the structure of the fine dust capturing device, an increase in the size of the outboard motor, and an increase in the manufacturing cost of the outboard motor.

DESCRIPTION OF EMBODIMENTS

Figure 1:
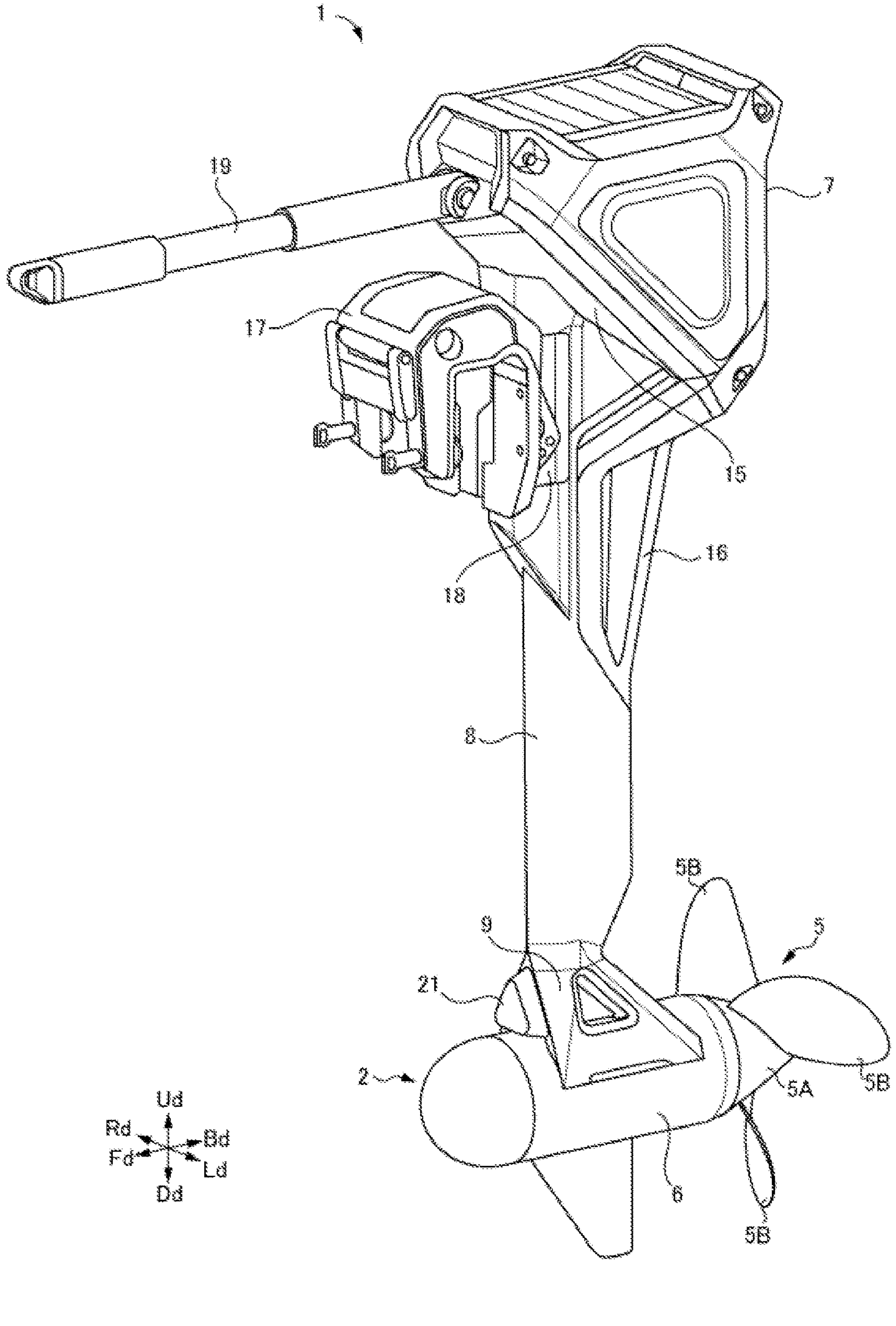
FIG. 1 is a perspective view illustrating an outboard motor according to a first embodiment of the present invention.

An outboard motor according to an embodiment of the present invention includes a propeller unit, a support portion formed in a columnar shape extending in an upper-lower direction and having a lower portion to which the propeller unit is supported, a bracket provided at an upper portion of the support portion and configured to attach the support portion to a ship, and a fine dust capturing device provided on the propeller unit or the support portion. The propeller unit includes a propeller shaft, a propeller fixed to the propeller shaft, and a case for rotatably supporting the propeller shaft.

In the outboard motor according to the present embodiment, the fine dust capturing device includes a water intake for taking in water around the outboard motor, a passage through which the water taken in from the water intake flows, a filter for capturing fine dust contained in the water by allowing the water flowing through the passage to pass therethrough, and a water outlet for discharging the water after passing through the filter to a periphery of the outboard motor.

The water outlet is positioned in front of the propeller. In addition, when the outboard motor is viewed from the rear side, the water outlet is positioned inside a circle having the same diameter as a diameter of the propeller, with a rotation center of the propeller as a center. Further, the water outlet faces in a direction other than a front side of the outboard motor, specifically, the water outlet faces a rear side, an upper side, a lower side, a left side, a right side, an upper left side, a lower left side, an upper right side, a lower right side, an upper rear side, a lower rear side, a left rear side, a right rear side, an upper left rear side, a lower left rear side, an upper right rear side, and a lower right rear side of the outboard motor.

In the outboard motor according to the present embodiment, the water outlet of the fine dust capturing device is positioned in front of the propeller, and when the outboard motor is viewed from the rear side, the water outlet of the fine dust capturing device is positioned inside the circle having the same diameter as the diameter of the propeller, with the rotation center of the propeller as the center, and the water outlet of the fine dust capturing device faces a direction other than the front side of the outboard motor. According to such a configuration, a negative pressure is formed outside the water outlet of the fine dust capturing device by the flow of water generated by the rotation of the propeller, and the water in the passage of the fine dust capturing device is sucked to the outside of the passage through the water outlet by the negative pressure. Accordingly, the flow rate of the water flowing through the passage of the fine dust capturing device can be increased, and thus the flow rate of the water passing through the filter can be increased. As a result, an amount of fine dust captured per unit sailing time of the ship and an amount of fine dust captured per unit sailing distance of the ship can be increased, and a capturing efficiency of fine dust can be increased.

According to the outboard motor of the present embodiment, since the flow rate of the water flowing through the passage of the fine dust capturing device can be increased without adding a pump, it is possible to prevent complication of the structure of the fine dust capturing device, an increase in size of the outboard motor, and an increase in manufacturing cost of the outboard motor due to the addition of the pump.

First Embodiment

An outboard motor according to a first embodiment of the present invention will be described with reference to FIGS. 1 to 4D. In the first embodiment, when describing directions of upper (Ud), lower (Dd), front (Fd), rear (Bd), left (Ld), and right (Rd), arrows at the lower left and lower right in FIGS. 1 to 3B follow.

Outboard Motor

Figure 2:
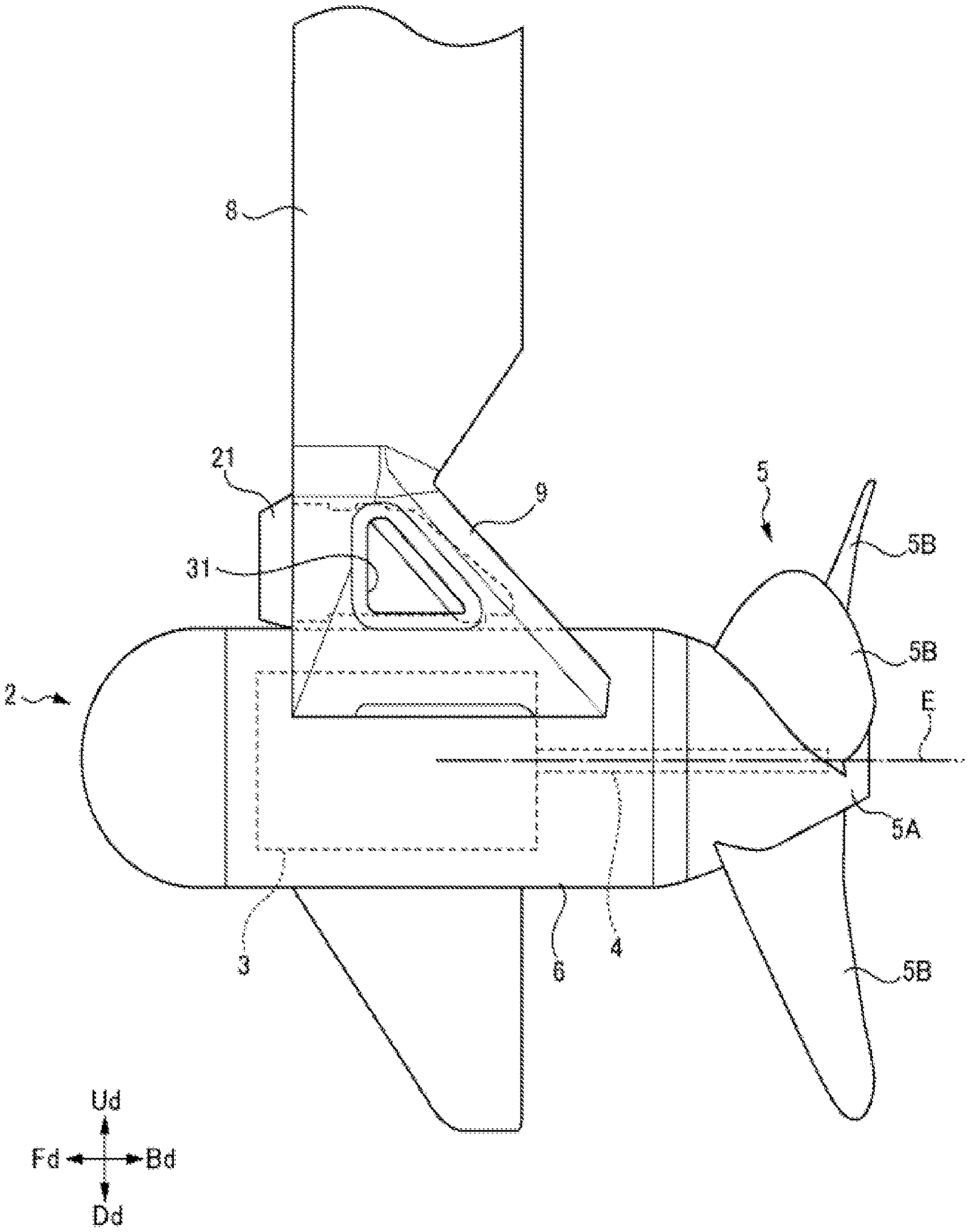
FIG. 2 is an explanatory view illustrating a state in which a lower portion of the outboard motor according to the first embodiment of the present invention is viewed from the left.
Figure 3B:
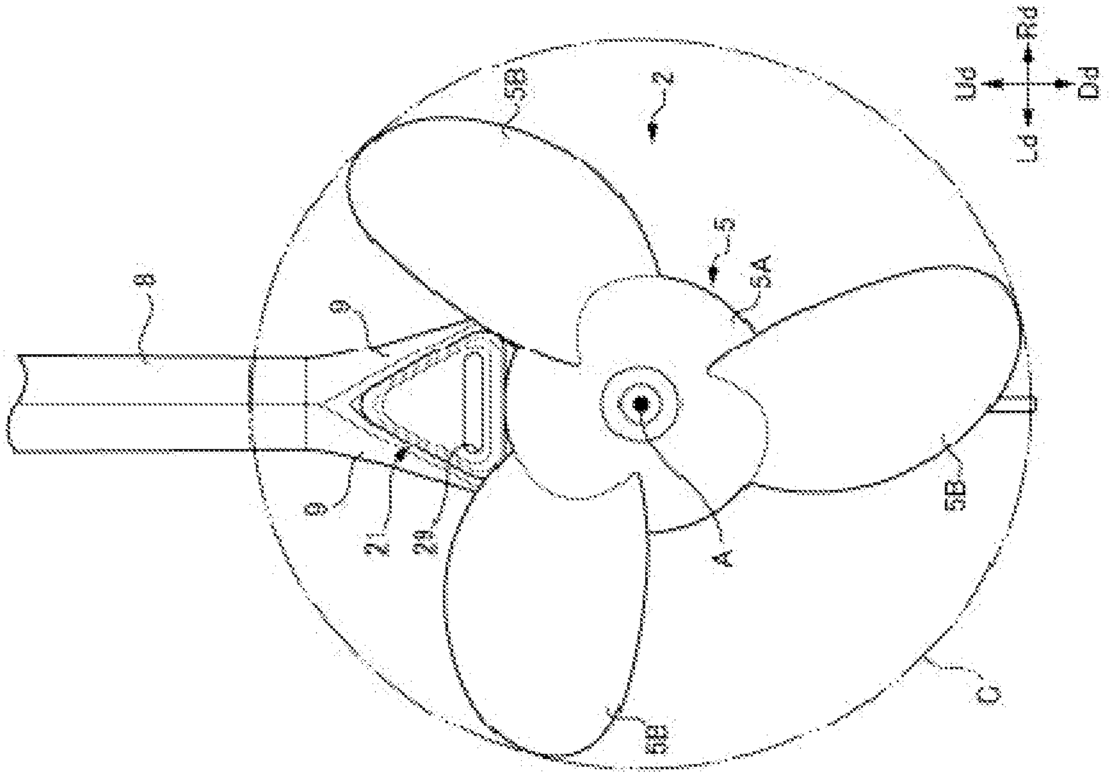
FIG. 3B is an explanatory view illustrating a state in which the lower portion of the outboard motor is viewed from a rear side.
Figure 3A:
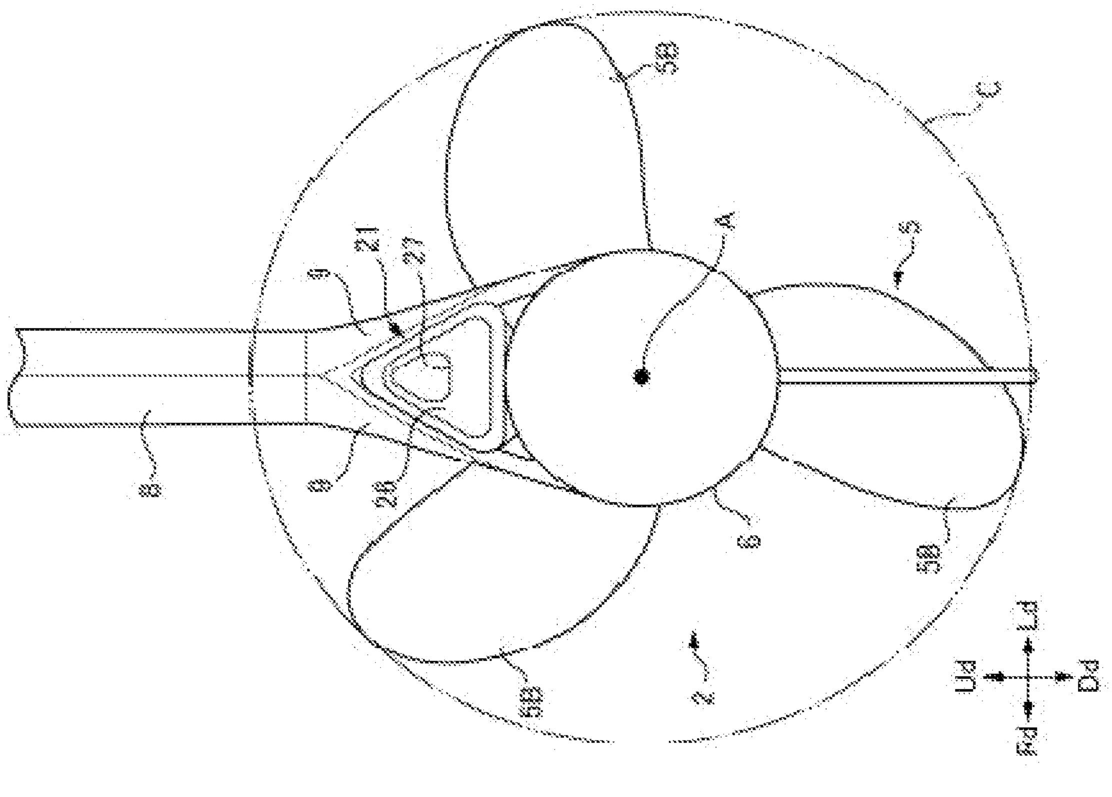
FIG. 3A is an explanatory view illustrating a state in which the lower portion of the outboard motor according to the first embodiment of the present invention is viewed from a front side.

FIG. 1 illustrates a state in which an outboard motor 1 according to the first embodiment of the present invention is viewed from the front upper left. FIG. 2 illustrates a state in which a lower portion of the outboard motor 1 is viewed from the left. FIG. 3A illustrates a state in which the lower portion of the outboard motor 1 is viewed from the front side. FIG. 3B illustrates a state in which the lower portion of the outboard motor 1 is viewed from the rear side.

The outboard motor 1 is a device that is attached to a transom of a ship to propel the ship. As illustrated in FIG. 1, the outboard motor 1 includes a propeller unit 2, a battery case 7, a support portion 8, a transom bracket 17, a swivel bracket 18, a bar handle 19, and a fine dust capturing device 21.

The propeller unit 2 is disposed in a lower portion of the outboard motor 1, and is positioned below the water surface in a state in which the outboard motor 1 is attached to the ship. As illustrated in FIG. 2, the propeller unit 2 includes a motor 3, a propeller shaft 4, a propeller 5, and a propeller unit case 6. The motor 3 is disposed at a front portion in the propeller unit case 6. The propeller shaft 4 extends in a front-rear direction, and a front portion of the propeller shaft 4 is rotatably supported by a rear portion in the propeller unit case 6. The propeller shaft 4 is connected to an output shaft of the motor 3, or is integrally formed with the output shaft of the motor 3, and is rotated by power of the motor 3. The propeller 5 is fixed to a rear end portion of the propeller shaft 4 and rotates integrally with the propeller shaft 4. The propeller 5 includes a hub 5A and a plurality of blades 5B. The propeller unit case 6 is a sealed cylindrical case.

As illustrated in FIG. 1, the battery case 7 is disposed in an upper portion of the outboard motor 1, and is positioned above the water surface in a state in which the outboard motor 1 is attached to the ship. A battery that supplies electric power for driving the motor 3 to the motor 3 is accommodated in the battery case 7.

The support portion 8 is a member that connects the battery case 7 and the propeller unit 2 and supports both. The propeller unit 2 is supported by a lower portion of the support portion 8, and the battery case 7 is supported by an upper portion of the support portion 8. Specifically, the support portion 8 is formed in a columnar shape extending in an upper-lower direction, and the propeller unit case 6 is fixed to the lower end portion of the support portion 8. An attachment plate portion 15 is fixed to an upper end portion of the support portion 8, and the battery case 7 is detachably attached to the attachment plate portion 15. In addition, an outboard motor carrying hand 16 for the user to carry the outboard motor 1 detached from the ship is provided at a rear portion of the support portion 8.

The transom bracket 17 is a clamp mechanism for attaching the outboard motor 1 to the transom of the ship. The transom bracket 17 is disposed at a front portion of the upper portion of the support portion 8.

The swivel bracket 18 is a bracket for making the outboard motor 1 attached to the transom rotatable in the left-right direction with respect to the ship, and is integrally formed with a rear portion of the transom bracket 17. A steering shaft (not illustrated) is rotatably attached to the swivel bracket 18, and the steering shaft is fixed to the front portion of the upper portion of the support portion 8. The support portion 8 can rotate with respect to the swivel bracket 18 with an axis of the steering shaft as a rotation axis, and as a result, the outboard motor 1 is rotatable in the left-right direction with respect to the ship.

The bar handle 19 is a handle that rotates the outboard motor 1 in the left-right direction with respect to the ship in order to steer the ship. The bar handle 19 is disposed above and in front of the support portion 8. Specifically, a base end portion of the bar handle 19 is attached to the upper front end portion of the attachment plate portion 15. The user can rotate the outboard motor 1 to the right or left with respect to the ship by grasping a distal end portion of the bar handle 19 and moving the bar handle 19 to the left or right, and can change a direction of the propeller 5 to the right or left.

Fine Dust Capturing Device

As illustrated in FIG. 2, the outboard motor 1 includes the fine dust capturing device 21. The fine dust capturing device 21 is a device that captures fine dust diffused in a water area such as sea, lakes, or rivers where the ship sails.

The fine dust is, for example, fine dust having an outer diameter or a maximum length of 0.1 mm or more and 5 mm or less. Plastic dust flows into the sea, lakes, rivers, and the like, and is crushed by waves or a water flow, or is decomposed by ultraviolet light or the like into minute plastic pieces. The minute plastic pieces may diffuse in water such as sea, lakes, and rivers. Such a minute plastic piece is generally called microplastic. The microplastic corresponds to fine dust.

Figure 4A:
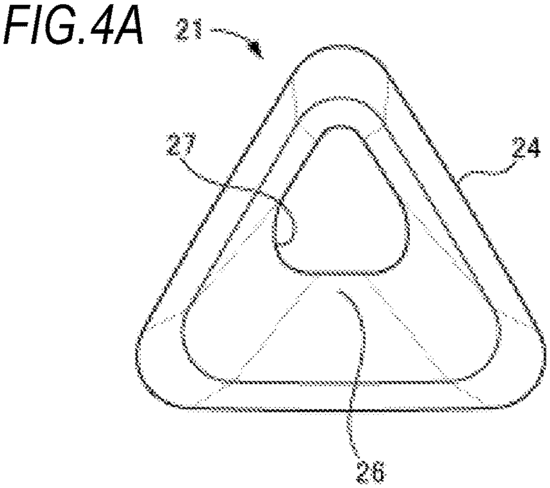
FIG. 4A is a front view of a fine dust capturing device in the outboard motor according to the first embodiment of the present invention.
Figure 4B:
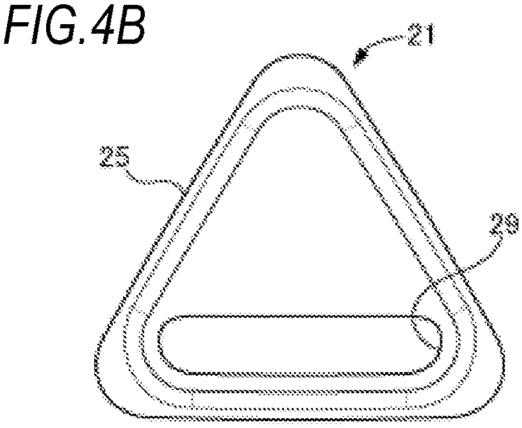
FIG. 4B is a back view of the fine dust capturing device.
Figure 4C:
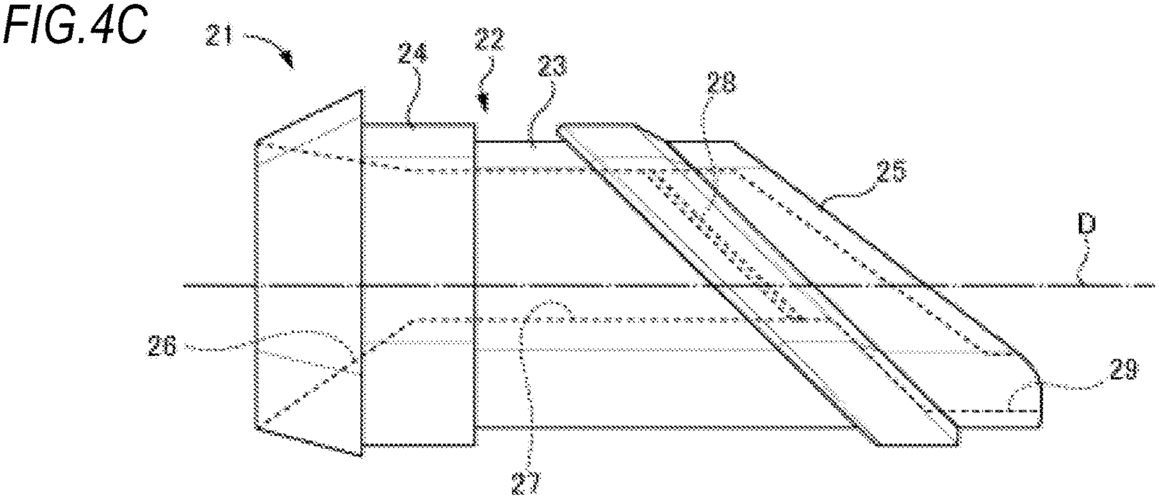
FIG. 4C is a left side view of the fine dust capturing device.
Figure 4D:
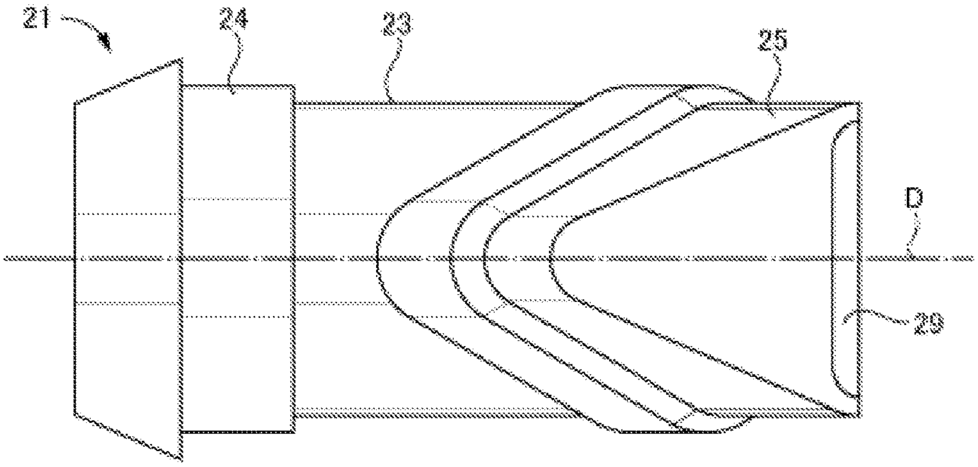
FIG. 4D is a plan view of the fine dust capturing device.

FIGS. 4A to 4D illustrate the fine dust capturing device 21. Specifically, FIG. 4A is a front view of the fine dust capturing device 21, FIG. 4B is a back view of the fine dust capturing device 21, FIG. 4C is a left side view of the fine dust capturing device 21, and FIG. 4D is a plan view of the fine dust capturing device 21.

In FIGS. 4A to 4D, the fine dust capturing device 21 includes a main body portion 22, a water intake 26 for taking in water around the outboard motor 1, a passage 27 through which the water taken in from the water intake 26 flows, a filter 28 for capturing fine dust contained in the water by allowing the water flowing through the passage 27 to pass therethrough, and a water outlet 29 for discharging the water after passing through the filter 28 to a periphery of the outboard motor 1.

The main body portion 22 is formed of, for example, resin or metal. As illustrated in FIG. 4C, the main body portion 22 has a passage forming portion 23, a water intake forming portion 24, and a water outlet forming portion 25. The passage forming portion 23 is formed in a tubular shape extending linearly. In the present embodiment, the passage forming portion 23 is formed in a triangular tubular shape having a substantially triangular cross-sectional shape. In FIG. 4C or FIG. 4D, D is an axis of the passage forming portion 23. The water intake forming portion 24 is attached and fixed to a portion on one axial end side of the passage forming portion 23 so as to cover one axial end side of the passage forming portion 23. The water outlet forming portion 25 is attached and fixed to a portion on the other axial end side of the passage forming portion 23 so as to cover the other axial end side of the passage forming portion 23.

As illustrated in FIG. 4A, the water intake 26 is formed in the water intake forming portion 24. The water intake 26 is a hole penetrating the water intake forming portion 24. The water intake 26 is disposed such that a center thereof is positioned above the center of the water intake forming portion 24, and the center of the water intake 26 is positioned above the axis D of the passage forming portion 23. In the present embodiment, the water intake 26 has a substantially triangular shape obtained by reducing the substantially triangular cross-sectional shape of the passage forming portion 23.

As illustrated in FIG. 4B, the water outlet 29 is formed in the water outlet forming portion 25. The water outlet 29 is a hole passing through the water outlet forming portion 25, the water outlet 29 is disposed such that a center thereof is positioned below the center of the water outlet forming portion 25, and the center of the water outlet 29 is positioned below the axis D of the passage forming portion 23. In addition, in the present embodiment, the water outlet 29 has a rectangular shape in which each corner portion is chamfered, and extends in a direction parallel to a bottom side of the substantially triangular cross section of the passage forming portion 23.

As illustrated in FIG. 4C, the passage 27 is provided inside the passage forming portion 23 of the main body portion 22. One end of the passage 27 is connected to the water intake 26, and the other end of the passage 27 is connected to the water outlet 29. The passage 27 extends from the water intake 26 through the passage forming portion 23 in an axial direction to the water outlet 29.

The filter 28 is provided in the middle of the passage 27. In the present embodiment, the filter 28 is disposed in a portion of the passage 27 on the rear side of the center thereof in the axial direction. The filter 28 is provided so as to block the entire cross section of the passage 27. The filter 28 is a filter capable of capturing fine dust, and is formed of, for example, a nonwoven fabric in a sheet shape or a plate shape. Water can pass through the filter 28, but fine dust cannot pass through the filter 28.

In the present embodiment, the filter 28 has a multi-layer structure. For example, the filter 28 includes a first layer having coarse openings and a second layer having fine openings. The filter 28 is disposed in the passage 27 such that the first layer is positioned on the water intake side and the second layer is positioned on the water outlet side. According to the structure and arrangement of the filter 28, when the water flows back through the passage 27 and flows in the direction from the water outlet 29 toward the water intake 26, it is possible to prevent the fine dust captured by the filter 28 from diffusing away from the filter 28. That is, when the water flows in a forward direction from the water intake 26 toward the water outlet 29 in the passage 27, the fine dust contained in the water is captured by the first layer or the second layer, but continuing such a flow of water in the forward direction, the fine dust is accumulated in an intermediate portion between the first layer and the second layer, or inside the second layer. On the other hand, when the water flows backward in the passage 27 and flows in a reverse direction from the water outlet 29 toward the water intake 26, the fine dust accumulated inside the second layer or in the intermediate portion between the first layer and the second layer is pushed toward the water intake 26 by the water. However, at this time, since the fine dust cannot easily pass through the first layer, most of the fine dust remains inside the second layer or in the intermediate portion between the first layer and the second layer. Accordingly, the fine dust captured by the filter 28 is prevented from diffusing away from the filter 28 by the backflow of water.

A material of the filter 28 is not limited to the non-woven fabric, and may be woven fabric, sponge, glass mat, or the like. The filter 28 may be a single layer.

As illustrated in FIG. 1, the fine dust capturing device 21 is provided at the lower end portion of the support portion 8, specifically, between the lower end portion of the support portion 8 and the propeller unit case 6. In the present embodiment, the lower end portion of the support portion 8 has a bifurcated structure branched in the left-right direction. Specifically, as illustrated in FIG. 3A, the lower end portion of the support portion 8 is provided with two coupling portions 9 that are respectively coupled to an upper left portion and an upper right portion of the propeller unit case 6. One coupling portion 9 extends downward from a left portion of the lower end portion of the support portion 8 while inclining leftward, and a lower end portion thereof is coupled to an upper left portion of a substantially intermediate portion of the propeller unit case 6 in the front-rear direction. The other coupling portion 9 extends downward from a right portion of the lower end portion of the support portion 8 while inclining rightward, and a lower end portion thereof is coupled to an upper right portion of the substantially intermediate portion of the propeller unit case 6 in the front-rear direction. With this structure, a space having a triangular shape in a front view is formed between the lower end portion of the support portion 8 and an upper surface (outer surface) of the propeller unit case 6. The fine dust capturing device 21 is disposed in this space.

In the fine dust capturing device 21, the passage forming portion 23 of the main body portion 22 is formed in a triangular tubular shape as described above, but a shape of the passage forming portion 23 corresponds to a shape of the space between the lower end portion of the support portion 8 and the upper surface of the propeller unit case 6. Therefore, the fine dust capturing device 21 is provided so as to be fitted in the space formed between the lower end portion of the support portion 8 and the upper surface of the propeller unit case 6. In a state in which the fine dust capturing device 21 is provided in the space between the lower end portion of the support portion 8 and the upper surface of the propeller unit case 6, an outer peripheral surface of the fine dust capturing device 21 (specifically, an outer peripheral surface of the water intake forming portion 24 and an outer peripheral surface of the water outlet forming portion 25) is in contact with an inner surface of each coupling portion 9 and the upper surface of the propeller unit case 6.

The main body portion 22 of the fine dust capturing device 21 is disposed in the space between the lower end portion of the support portion 8 and the upper surface of the propeller unit case 6 such that the water intake 26 faces the front side of the outboard motor 1 and the water outlet 29 faces the rear side of the outboard motor 1. In addition, as illustrated in FIG. 3A or FIG. 3B, the main body portion 22, the water intake 26, the passage 27, the filter 28, and the water outlet 29, that is, the fine dust capturing device 21 as a whole are positioned in front of the propeller 5, and when the outboard motor 1 is viewed from the front side or the rear side, the main body portion 22, the water intake 26, the passage 27, the filter 28, and the water outlet 29 are positioned inside a circle C having the same diameter as the diameter of the propeller 5, with a rotation center A of the propeller 5 as a center.

As illustrated in FIG. 3A, when the outboard motor 1 is viewed from the front side, the water intake 26 is disposed inside the circle C, above the propeller unit case 6, and at a position above the rotation center A of the propeller 5 in a vertical direction. In addition, the water intake 26 faces the front side of the outboard motor 1 from the position and in a direction parallel to an axis E of the propeller shaft 4.

As illustrated in FIG. 3B, when the outboard motor 1 is viewed from the rear side, the water outlet 29 is disposed inside the circle C, above the propeller unit case 6, and above the rotation center A of the propeller 5 in the vertical direction. In addition, the water outlet 29 faces the rear side of the outboard motor 1 from the position and in the direction parallel to the axis E of the propeller shaft 4.

In the present embodiment, the passage forming portion 23 is formed of a transparent resin. As illustrated in FIG. 2, each of the coupling portions 9 is provided with a window 31. The window 31 is formed by a hole penetrating the coupling portion 9. The transparent passage forming portion 23 is disposed at a position corresponding to the window 31. Accordingly, the user can confirm the amount of fine dust accumulated in the filter 28 by looking through the window 31 when the outboard motor 1 is pulled up on the ground, for example.

In the present embodiment, the fine dust capturing device 21 can be removed from the space formed between the lower end portion of the support portion 8 and the upper surface of the propeller unit case 6. Further, in the main body portion 22 of the fine dust capturing device 21, the water outlet forming portion 25 is detachably attached to a rear portion of the passage forming portion 23. In the main body portion 22, the filter 28 is detachably attached between a portion on a rear end side of the passage forming portion 23 and a portion on a front end side of the water outlet forming portion 25. When the user pulls up the outboard motor 1 to the ground and looks through the window 31 to confirm that a large amount of fine dust is accumulated in the filter 28, the user can remove the fine dust capturing device 21 from the outboard motor 1 and replace the filter 28.

In the fine dust capturing device 21 having such a configuration, the propeller unit 2 and the fine dust capturing device 21 sink below the water surface in a state in which the outboard motor 1 is attached to the transom of the ship on the water surface. When the propeller 5 rotates and the ship is moving forward by a propulsive force generated by the propeller 5, water flows into the water intake 26 from the front side of the outboard motor 1. The water flowing into the water intake 26 flows rearward in the passage 27 toward the water outlet 29. The water flowing through the passage 27 toward the water outlet 29 passes through the filter 28. When the water passes through the filter 28, fine dust contained in the water is captured by the filter 28. The water passing through the filter 28 is discharged rearward from the water outlet 29.

The water intake 26 is positioned below the water surface, is disposed at a front portion of the outboard motor 1, and faces the front side of the outboard motor 1. Therefore, the water flows into the passage 27 through the water intake 26 as the ship moves forward. The water outlet 29 is positioned below the water surface, is positioned in front of the propeller 5, and is positioned inside the circle C having the same diameter as the propeller 5, with the rotation center A of the propeller 5 as the center, when the outboard motor 1 is viewed from the rear side. In addition, the water outlet 29 faces the rear side of the outboard motor 1. Therefore, a negative pressure is formed outside the water outlet 29 by the flow of water generated by the rotation of the propeller 5, and the water in the passage 27 is sucked to the outside of the passage 27 through the water outlet 29 by the negative pressure. Due to the pressure of the water flowing into the passage 27 via the water intake 26 and the negative pressure formed outside the water outlet 29 by the water flow generated by the rotation of the propeller 5, the water flows in the passage 27 from the water intake 26 toward the water outlet 29, and the water passes through the filter 28, whereby the fine dust is captured.

As described above, in the outboard motor 1 according to the first embodiment of the present invention, the water outlet 29 of the fine dust capturing device 21 is positioned in front of the propeller 5, when the outboard motor 1 is viewed from the rear side, the water outlet 29 is positioned inside the circle C having the same diameter as the propeller 5, with the rotation center A of the propeller 5 as the center, and the water outlet 29 faces the rear side of the outboard motor 1. According to this configuration, the water in the passage 27 of the fine dust capturing device 21 can be sucked to the outside of the passage 27 through the water outlet 29 by using the negative pressure formed outside the water outlet 29 by the water flow generated by the rotation of the propeller 5. Accordingly, the flow rate of the water flowing through the passage 27 of the fine dust capturing device 21 can be increased, and thus the flow rate of the water passing through the filter 28 can be increased. As a result, the amount of fine dust captured per unit sailing time of the ship and the amount of fine dust captured per unit sailing distance of the ship can be increased, and a capturing efficiency of fine dust can be increased. According to this configuration, since the flow rate of the water flowing through the passage 27 of the fine dust capturing device 21 can be increased without adding a pump, it is possible to prevent complication of the structure of the fine dust capturing device 21, an increase in size of the outboard motor 1, and an increase in manufacturing cost of the outboard motor 1 due to the addition of the pump. As described above, according to the outboard motor 1 of the first embodiment, it is possible to increase the capturing efficiency of the fine dust while avoiding complication of the structure of the fine dust capturing device 21, an increase in the size of the outboard motor 1, and an increase in the manufacturing cost of the outboard motor 1.

In the outboard motor 1 according to the present embodiment, the water outlet 29 of the fine dust capturing device 21 faces the rear side of the outboard motor 1 and in the direction parallel to the axis E of the propeller shaft 4. According to this configuration, for example, compared to a case where the water outlet 29 face the rear side of the outboard motor 1, in a direction not parallel to the axis E of the propeller shaft 4, or in a direction parallel to a straight line orthogonal to the axis E of the propeller shaft 4, the negative pressure formed outside the water outlet 29 by the water flow generated by the rotation of the propeller 5 is increased, and thus a force of sucking the water in the passage 27 to the outside of the passage 27 through the water outlet 29 is increased. Accordingly, the flow rate of the water flowing through the passage 27 can be further increased, and the capturing efficiency of the fine dust can be further increased.

In the outboard motor 1 according to the present embodiment, the fine dust capturing device 21 includes the main body portion 22 formed in a tubular shape extending linearly, the water intake 26 is provided at one axial end portion of the main body portion 22, the water outlet 29 is provided at the other axial end portion of the main body portion 22, the passage 27 penetrates the main body portion 22 in the axial direction from the water intake 26 to reach the water outlet 29, and the filter 28 is provided in the middle of the passage 27. With this configuration, in the fine dust capturing device 21, the passage 27 from the water intake 26 to the water outlet 29 can be shortened, and the entire passage 27 can be formed in a shape close to a straight line. Accordingly, a resistance of the water flowing through the passage 27 can be reduced. Since the fine dust capturing device 21 having such a configuration is disposed at a position in front of the propeller 5 and inside the circle C when the outboard motor 1 is viewed from the rear side such that the water intake 26 faces the front side of the outboard motor 1 and the water outlet 29 faces the rear side of the outboard motor 1, when the ship moves forward, the water around the outboard motor can smoothly flow into the passage 27 of the fine dust capturing device 21, the water flowing into the passage 27 can smoothly flow toward the water outlet 29, and the water in the passage 27 can smoothly flow out from the water outlet 29 using the negative pressure. Thus, the flow rate of water passing through the filter 28 can be increased, and the capturing efficiency of fine dust can be increased.

In the outboard motor 1 according to the present embodiment, the fine dust capturing device 21 is provided at the lower end portion of the support portion 8, specifically, between the lower end portion of the support portion 8 and the propeller unit case 6. Accordingly, the fine dust capturing device 21 can be easily disposed at the position in front of the propeller 5 and inside the circle C when the outboard motor 1 is viewed from the rear side.

The fine dust capturing device 21 is in contact with an outer surface of the propeller unit case 6. As a result, the fine dust capturing device 21 can be brought very close to the propeller unit 2, and the fine dust capturing device 21 can be reliably placed in the water flow generated by the rotation of the propeller 5.

Second Embodiment

An outboard motor according to a second embodiment of the present invention will be described with reference to FIG. 5. In the second embodiment, when describing directions of the upper (Ud), the lower (Dd), the front (Fd), and the rear (Bd), arrows at the lower left in FIG. 5 follow. The outboard motor according to the second embodiment of the present invention is different from the outboard motor 1 according to the first embodiment of the present invention in that the water outlet of the fine dust capturing device faces the rear side of the outboard motor and in a direction not parallel to the axis of the propeller shaft.

Figure 5:
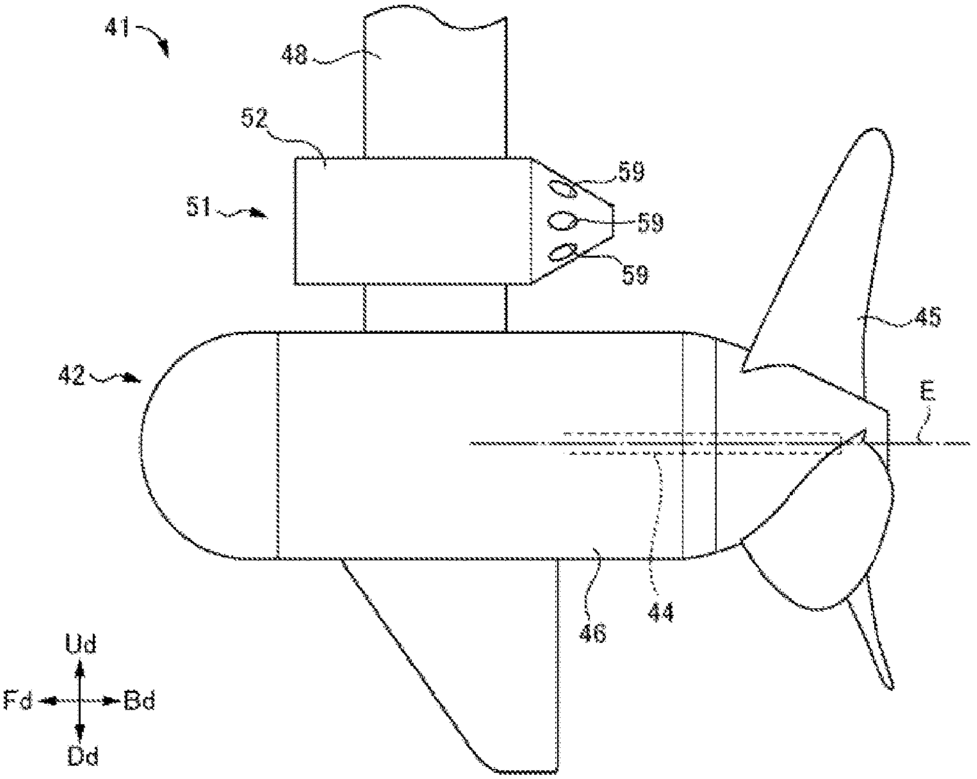
FIG. 5 is an explanatory view illustrating an outboard motor according to a second embodiment of the present invention.

FIG. 5 illustrates a state in which a lower portion of an outboard motor 41 according to the second embodiment of the present invention is viewed from the left. In FIG. 5, the outboard motor 41 includes a fine dust capturing device 51, and the fine dust capturing device 51 is provided at a lower end portion of a support portion 48 and in vicinity of a propeller unit case 46 of a propeller unit 42. The fine dust capturing device 51 is positioned in front of a propeller 45, and is positioned inside a circle having the same diameter as a diameter of the propeller 45, with a rotation center of the propeller 45 as a center, when the outboard motor 41 is viewed from the rear side. The fine dust capturing device 51 includes a main body portion 52 formed in a cylindrical shape. In addition, a water intake is provided in a front surface of the main body portion 52, a plurality of water outlets 59 are provided in a peripheral portion of a rear portion of the main body portion 52, a passage from the water intake to the water outlets 59 is provided in the main body portion 52, and a filter is provided in the middle of the passage.

Specifically, six water outlets 59 are disposed at intervals of 60 degrees in the peripheral portion of the rear portion of the main body portion 52. An outer diameter of the rear portion of the main body portion 52 decreases toward the rear, and as a result, an outer surface of the peripheral portion of the rear portion of the main body portion 52 is inclined. The six water outlets 59 are open to the inclined outer surface of the peripheral portion of the rear portion of the main body portion 52. The six water outlets 59 faces the rear side of the outboard motor 41 and in a direction not parallel to the axis E of the propeller shaft 44. That is, the six water outlets 59 face a left rear side, an upper left rear side, a lower left rear side, a right rear side, an upper right rear side, and a lower right rear side, respectively.

Also in the outboard motor 41 according to the second embodiment of the present invention having such a configuration, it is possible to obtain an effect that the water in the passage of the fine dust capturing device 51 is sucked to the outside of the passage through the water outlet 59 by the negative pressure formed by the water flow generated by the rotation of the propeller 45 when the ship moves forward. Accordingly, the flow rate of the water flowing through the passage of the fine dust capturing device 71 can be increased, and the capturing efficiency of fine dust can be increased.

Third Embodiment

An outboard motor according to a third embodiment of the present invention will be described with reference to FIG. 6. In the third embodiment, when describing directions of the upper (Ud), the lower (Dd), the front (Fd), and the rear (Bd), arrows at the lower left in FIG. 6 follow. The outboard motor according to the third embodiment of the present invention is different from the outboard motor 1 according to the first embodiment of the present invention in that the water outlet of the fine dust capturing device faces in a direction parallel to a straight line orthogonal to the axis of the propeller shaft.

Figure 6:
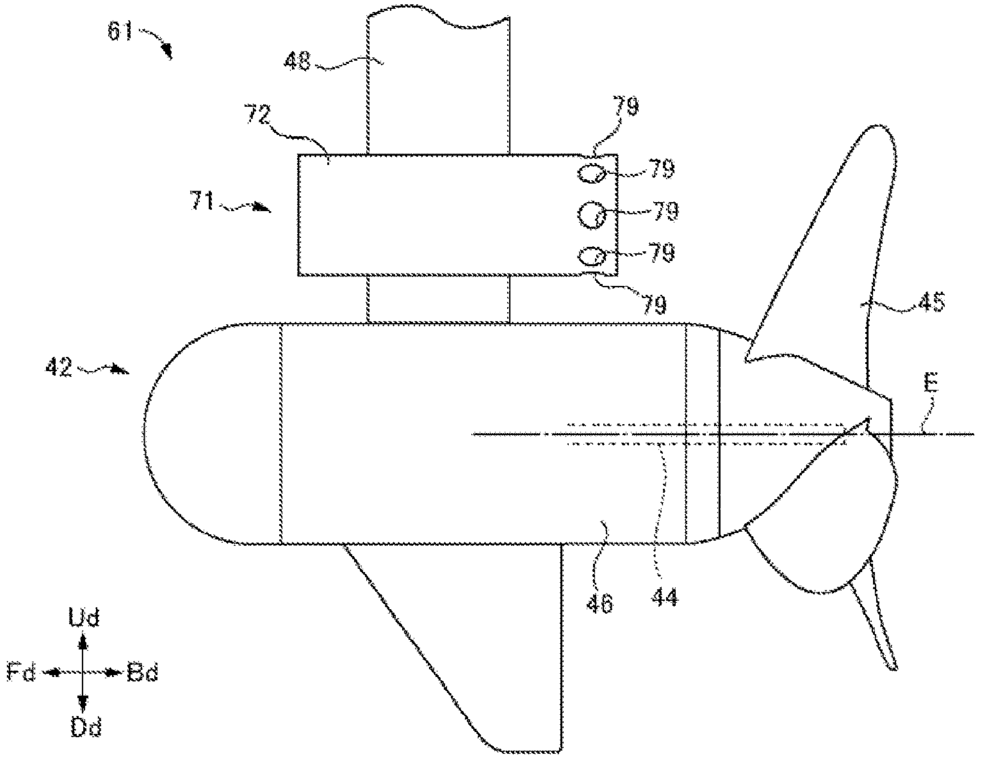
FIG. 6 is an explanatory view illustrating an outboard motor according to a third embodiment of the present invention.

FIG. 6 illustrates a state in which a lower portion of an outboard motor 61 according to the third embodiment of the present invention is viewed from the left. In FIG. 6, the outboard motor 61 is obtained by replacing the fine dust capturing device 51 in the outboard motor 41 according to the second embodiment of the present invention illustrated in FIG. 5 with a fine dust capturing device 71 having a water outlet oriented in a different direction. The fine dust capturing device 71 includes a main body portion 72 formed in a cylindrical shape. In addition, a water intake is provided in a front surface of the main body portion 72, a plurality of water outlets 79 are provided in a peripheral portion of a rear portion of the main body portion 72, a passage from the water intake to the water outlets 79 is provided in the main body portion 72, and a filter is provided in the middle of the passage.

Specifically, eight water outlets 79 are disposed at intervals of 45 degrees in the peripheral portion of the rear portion of the main body portion 72. The eight water outlets 79 face in a direction parallel to a straight line orthogonal to the axis E of the propeller shaft 44. That is, the eight water outlets 79 face an upper side, a lower side, the left side, the right side, an upper left side, a lower left side, an upper right side, and a lower right side, respectively.

Also in the outboard motor 61 according to the third embodiment of the present invention having such a configuration, it is possible to obtain an effect that the water in the passage of the fine dust capturing device 71 is sucked to the outside of the passage through the water outlet 79 by the negative pressure formed by the water flow generated by the rotation of the propeller 45 when the ship moves forward. Accordingly, the flow rate of the water flowing through the passage of the fine dust capturing device 71 can be increased, and the capturing efficiency of fine dust can be increased.

Fourth Embodiment

An outboard motor according to a fourth embodiment of the present invention will be described with reference to FIG. 7. In the fourth embodiment, when describing the directions of the upper (Ud), the lower (Dd), the left (Ld), and the right (Rd), arrows at the lower left in FIG. 7 follow. The outboard motor according to the fourth embodiment of the present invention is different from the outboard motor 1 according to the first embodiment of the present invention in that the fine dust capturing device is disposed at a position not intersecting the axis of the support portion.

Figure 7:
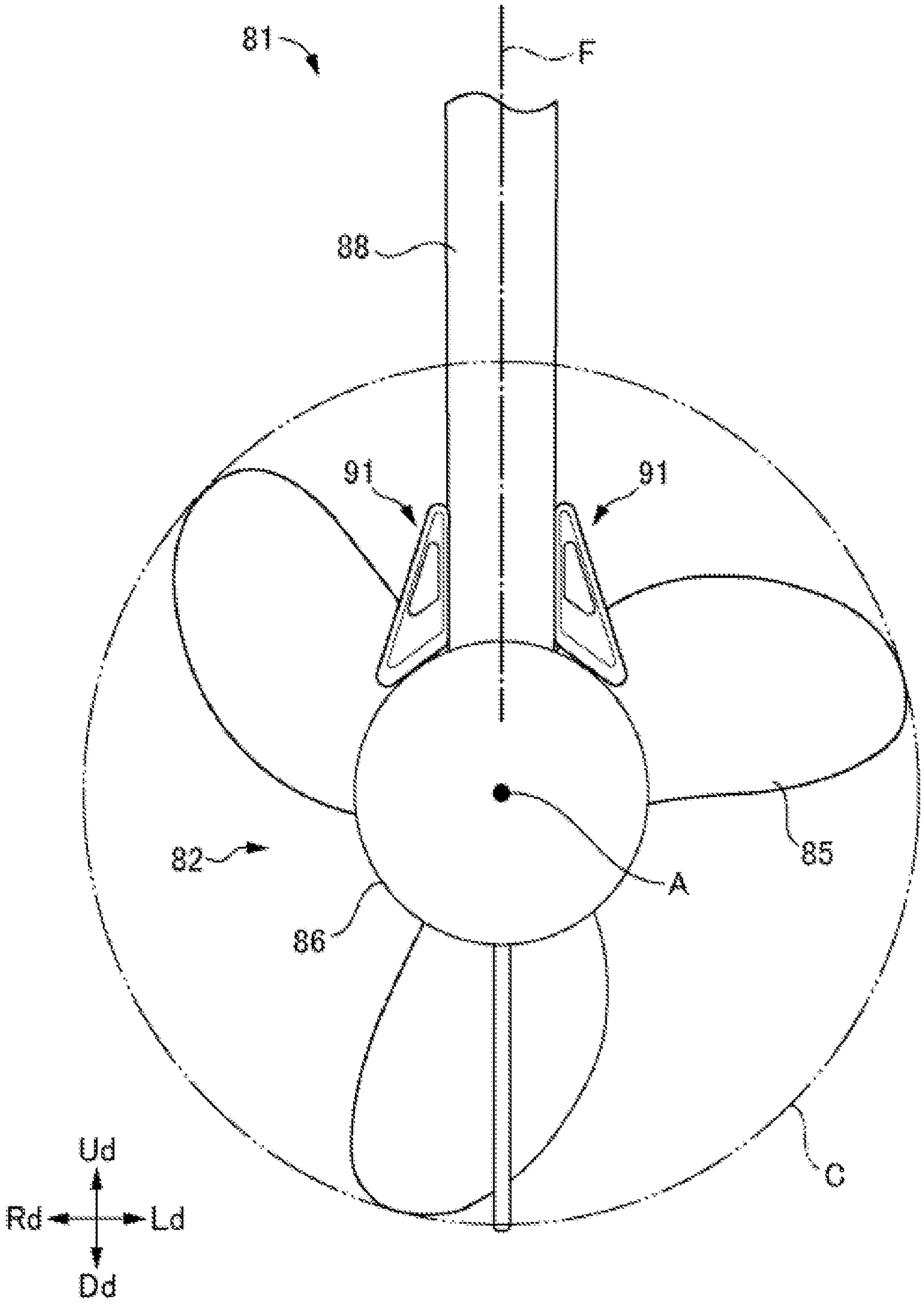
FIG. 7 is an explanatory view illustrating an outboard motor according to a fourth embodiment of the present invention.

FIG. 7 illustrates a state in which a lower portion of an outboard motor 81 according to the fourth embodiment of the invention is viewed from the front side. In FIG. 7, a lower end of the support portion 88 of the outboard motor 81 is fixed to a propeller unit case 86 of a propeller unit 82. Unlike the support portion 8 illustrated in FIG. 3A, a lower end portion of the support portion 88 does not have a bifurcated structure. Further, two fine dust capturing devices 91 are provided at the lower end portion of the support portion 88, one fine dust capturing device 91 is disposed on a left side of the lower end portion of the support portion 88, and the other fine dust capturing device 91 is disposed on a right side of the lower end portion of the support portion 88. Each of the fine dust capturing devices 91 has the same configuration as the fine dust capturing device 21 illustrated in FIGS. 4A to 4D. Further, each of the fine dust capturing devices 91 is positioned in front of the propeller 85, and is positioned inside the circle C having the same diameter as the diameter of the propeller 85, with the rotation center A of the propeller 85 as a center, when the outboard motor 81 is viewed from the rear side. In addition, each of the fine dust capturing devices 91 is disposed such that the water intake faces the front side of the outboard motor 81 and the water outlet faces the rear side of the outboard motor 81.

Also in the outboard motor 81 according to the fourth embodiment of the present invention having such a configuration, it is possible to obtain an effect that the water in the passage of the fine dust capturing device 91 is sucked to the outside of the passage through the water outlet by the negative pressure formed by the water flow generated by the rotation of the propeller 85 when the ship moves forward. Accordingly, the flow rate of the water flowing through the passage of the fine dust capturing device 91 can be increased, and the capturing efficiency of fine dust can be increased.

According to the outboard motor 81 of the fourth embodiment of the present invention, it is possible to easily form an outboard motor having a configuration in which a motor or an internal combustion engine is provided in the upper portion of the outboard motor, a drive shaft is provided in the support portion, a gear mechanism is provided in the propeller unit case of the propeller unit, and power of the motor is transmitted to the propeller shaft via the drive shaft and the gear mechanism. That is, in the outboard motor 81, since the fine dust capturing device 91 is disposed at a position where the fine dust capturing device 91 does not intersect with an axis F of the support portion 88, when the drive shaft is provided in the support portion 88, the drive shaft can be extended to the inside of the propeller unit case 86 of the propeller unit 82. Therefore, a lower end of the drive shaft is easily connected to the gear mechanism provided in the propeller unit case 86.

In each of the above embodiments, when the outboard motor 1 (41, 61, 81) is viewed from the rear side, the entire fine dust capturing device 21 (51, 71, 91) is positioned inside the circle having the same diameter as the propeller 5 (45, 85), with the rotation center of the propeller 5 (45, 85) as the center, but the present invention is not limited thereto. When the outboard motor is viewed from the rear side, in the fine dust capturing device, a portion other than the portion where the water outlet is disposed may be positioned outside a circle having the same diameter as the diameter of the propeller, with the rotation center of the propeller as the center. For example, the water intake, a part of the passage, a filter, or the like may be positioned outside the circle.

In the above embodiments, the case where the fine dust capturing device is provided between the lower end of the support portion and the propeller unit as illustrated in FIG. 2 and the case where the fine dust capturing device is provided at the lower end portion of the support portion as illustrated in FIG. 5 are taken as examples, but the present invention is not limited thereto. The fine dust capturing device may be provided in the propeller unit case of the propeller unit.

The present invention can be appropriately changed without departing from the gist or concept of the invention which can be read from the claims and the entire specification, and an outboard motor with such a change is also included in the technical concept of the present invention.

The invention claimed is:

1. An outboard motor for propelling a ship, the outboard motor comprising:

a propeller unit including a propeller shaft, a propeller fixed to the propeller shaft, and a case for rotatably supporting the propeller shaft;

a support portion formed in a columnar shape extending in an upper-lower direction and having a lower portion to which the propeller unit is supported;

a bracket provided at an upper portion of the support portion and configured to attach the support portion to the ship; and a fine dust capturing device provided on the propeller unit or the support portion, wherein the fine dust capturing device includes a water intake for taking in water around the outboard motor, a passage through which the water taken in from the water intake flows, a filter for capturing fine dust contained in the water by allowing the water flowing through the passage to pass therethrough, and a water outlet for discharging the water after passing through the filter to a periphery of the outboard motor, and the water outlet is positioned in front of the propeller and inside a circle having the same diameter as a diameter of the propeller, with a rotation center of the propeller as a center, when the outboard motor is viewed from a rear side, and faces in a direction other than a front side of the outboard motor.

2. The outboard motor according to claim 1, wherein the water outlet face a rear side of the outboard motor.

3. The outboard motor according to claim 1, wherein the water outlet faces a rear side of the outboard motor and in a direction parallel to an axis of the propeller shaft.

4. The outboard motor according to claim 1, wherein the water intake, the passage, the filter, and the water outlet are positioned in front of the propeller and inside a circle having the same diameter as the diameter of the propeller, with the rotation center of the propeller as the center, when the outboard motor is viewed from the rear side.

5. The outboard motor according to claim 1, wherein the fine dust capturing device includes a main body portion formed in a tubular shape extending linearly, the water intake is provided at one axial end portion of the main body portion, the water outlet is provided at the other axial end portion of the main body portion, the passage penetrates the main body portion in an axial direction from the water intake to reach the water outlet, and the filter is provided in the middle of the passage.

6. The outboard motor according to claim 5, wherein the main body portion is provided in the propeller unit or the support portion such that the water intake faces the front side of the outboard motor and the water outlet faces a rear side of the outboard motor.

7. The outboard motor according to claim 1, wherein the fine dust capturing device is provided at a lower end portion of the support portion.

8. The outboard motor according to claim 7, wherein the fine dust capturing device is in contact with an outer surface of the case.

* * * * *